(12) United States Patent
Jorgensen

(10) Patent No.: US 9,015,428 B2
(45) Date of Patent: Apr. 21, 2015

(54) PHYSICAL AND LOGICAL COUNTERS

(71) Applicant: Hewlett-Packard Development Company, L.P., Houston, TX (US)

(72) Inventor: Steven Glen Jorgensen, Newcastle, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 313 days.

(21) Appl. No.: 13/630,320

(22) Filed: Sep. 28, 2012

(65) Prior Publication Data

US 2014/0095783 A1  Apr. 3, 2014

(51) Int. Cl.
*G06F 12/08* (2006.01)
*G06F 9/30* (2006.01)

(52) U.S. Cl.
CPC .................................. *G06F 9/30* (2013.01)

(58) Field of Classification Search
None
See application file for complete search history.

(56) References Cited

U.S. PATENT DOCUMENTS

| | | | | |
|---|---|---|---|---|
| 5,386,369 | A * | 1/1995 | Christiano | 705/400 |
| 7,058,839 | B2 * | 6/2006 | Imming | 713/500 |
| 7,548,964 | B2 | 6/2009 | Arndt et al. | |
| 7,694,035 | B2 | 4/2010 | Chen et al. | |
| 7,904,697 | B2 * | 3/2011 | Barrick et al. | 712/217 |
| 8,108,511 | B2 * | 1/2012 | Britt | 709/224 |
| 8,189,464 | B2 | 5/2012 | Acharya et al. | |
| 8,601,170 | B1 * | 12/2013 | Marr et al. | 710/8 |
| 8,661,230 | B2 * | 2/2014 | Alexander et al. | 712/217 |
| 8,798,962 | B2 * | 8/2014 | Bose et al. | 702/186 |
| 2003/0196131 | A1 * | 10/2003 | Imming | 713/502 |
| 2005/0183065 | A1 * | 8/2005 | Wolczko et al. | 717/124 |
| 2007/0139421 | A1 * | 6/2007 | Chen et al. | 345/501 |
| 2007/0294394 | A1 * | 12/2007 | Britt | 709/224 |
| 2009/0207848 | A1 * | 8/2009 | Kwan et al. | 370/397 |
| 2010/0318786 | A1 * | 12/2010 | Douceur et al. | 713/155 |
| 2012/0096221 | A1 | 4/2012 | Cheriton et al. | |
| 2012/0245897 | A1 * | 9/2012 | Bose et al. | 702/186 |
| 2012/0265969 | A1 * | 10/2012 | Alexander et al. | 712/220 |
| 2012/0265971 | A1 * | 10/2012 | Alexander et al. | 712/225 |
| 2014/0059329 | A1 * | 2/2014 | Alexander et al. | 712/225 |

OTHER PUBLICATIONS

Virtual monotonic counters and count-limited objects using a TPM without a trusted OS. Sarmenta, Luis F. G. et al. In Proceedings of the First ACM Workshop on Scalable Trusted Computing, STC'06. A workshop held in conjuction with the 13th ACM Conference on Computer and Communications Security, CCS'06, Dec. 1, 2006.*
Stanojevic, R. ; Small Active Counters ; Hamilton Institute, NUIM, Ireland; http://eprints.nuim.ie/1682/1/counter.pdf> on pp. 2153-2161 ; May 6-12, 2007.

* cited by examiner

*Primary Examiner* — Kevin Verbrugge
(74) *Attorney, Agent, or Firm* — Hewlett-Packard Legal Dept

(57) ABSTRACT

Techniques for reducing a number of physical counters are provided. Logical counters may be associated with physical counters. The number of physical counters may be less than the number of logical counters. It may be determined if an association of a logical counter to a physical counter exists already. If not, a new association may be created. The physical counter associated with the logical counter may then be updated.

17 Claims, 5 Drawing Sheets

PHYSICAL AND LOGICAL COUNTERS

BACKGROUND

Integrated circuits often use counters to monitor the number of occurrences of an event of interest. For example, in an integrated circuit used in a switch or router, it may be desired to keep track of certain events, such as the total number of packets processed, the number of packets processed of a particular type, the number of packets processed of a particular length, and any number of other performance metrics.

When an event of interest occurs, a counter associated with that particular event may be determined. The determined counter may then be incremented. The count may be retrieved directly from the integrated circuit. In some implementations, the value of the counter may be periodically sent to an external memory. An application wishing to determine the value of the counter may retrieve the value from the external memory, as opposed to retrieving the value directly from the integrated circuit.

DETAILED DESCRIPTION

Figure 1:
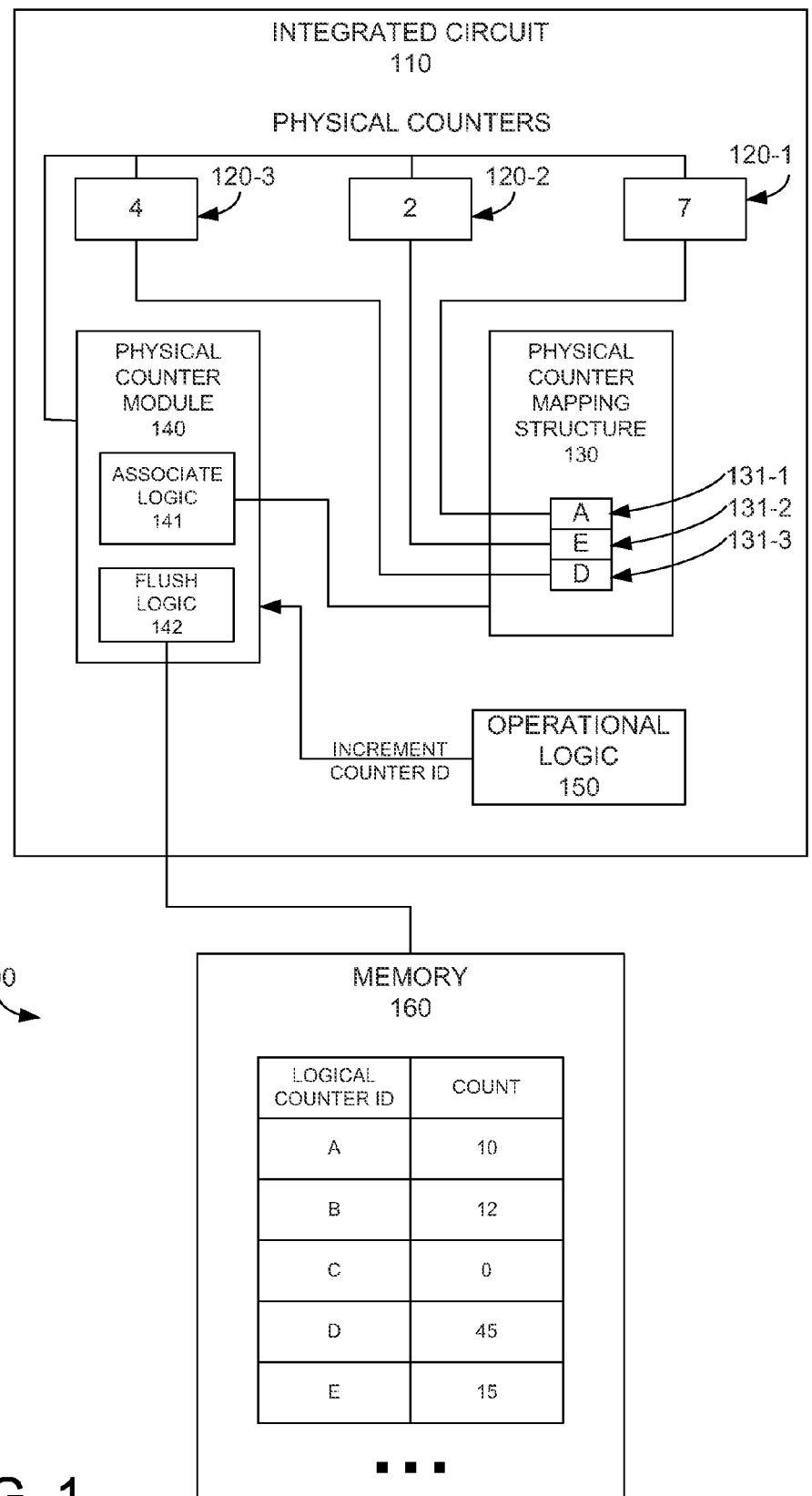
FIG. 1 depicts an example high level block diagram of an integrated circuit which utilizes the techniques described herein.

The use of counters to measure various performance characteristics of an integrated circuit provides for a convenient way to measure the performance of the integrated circuit. However, a problem arises as the number of events that are to be counted increases. With the addition of each event to be counted, additional circuitry is needed on the integrated circuit. For example, storage space is needed to store the current value of the counter. In addition, logic is needed to increment the counter. Additional logic is also needed to store the value of the counter into external memory. For example, software may periodically poll internal ASIC registers and update the external memory.

The additional circuitry needed to add counters may increase roughly in proportion to the total number of counters. Thus, as more counters are added, more die space on the integrated circuit must be allocated for the circuitry associated with the counters. In modern integrated circuits, die space is typically a limited resource. As more and more die space is allocated for counters, less space is available for other functions. Further exacerbating the problem is the fact that counters are often not directly related to the functioning of the integrated circuit. For example, in a network switch, a counter that counts the number of packets that have passed through the switch may provide useful information as to the utilization of the switch. However, the counter itself is not directly related to the ability of the switch to process packets. Thus, the die space occupied by the counter may reduce the die space available for circuitry that actually improves the ability of the integrated circuit to process packets.

The techniques described herein overcome this problem through the use of a fixed set of physical counters. These physical counters have the necessary circuitry to provide the functionality of a counter. The total number of physical counters may be less than the number of events that it is desired to count. For example, there may be twenty different event types to be counted, but only three physical counters have been implemented on the die. Thus, the die space on the integrated circuit used for the physical counters is reduced to the number of physical counters implemented, rather than requiring a physical counter for each event type that is to be counted.

Each event type that is to be counted is associated with a logical counter. For example, if there are twenty different types of events, there may be twenty logical counters. When an event is to be counted, which means that the logical counter associated with that event is to be incremented, the fixed set of physical counters is examined to determine if one of the physical counters is currently associated with the logical counter that is to be incremented. If so, the physical counter is simply incremented. If not, a physical counter from the set of physical counters is selected. The selected physical counter's current value is flushed to an external memory. The selected physical counter may then be associated with the logical counter that is to be incremented. The selected physical counter may then be incremented. Thus, there is no longer a need to have a dedicated physical counter for each event type that is to be counted, as a physical counter may be dynamically associated with a logical counter when needed.

FIG. 1 depicts an example high level block diagram of an integrated circuit which utilizes the techniques described herein. The system 100 may include an integrated circuit 110 which implements the techniques described herein. The integrated circuit may be an application specific integrated circuit (ASIC) or any other type of integrated circuit. There may be certain events on the integrated circuit that need to be counted. Each event type that is to be counted will be counted by what will be referred to as a logical counter. Each logical counter may comprise an identifier which identifies the particular event that is being counted. The logical counters are not directly associated with circuitry on the integrated circuit.

The integrated circuit may also include a plurality of physical counters. Three physical counters 120-1-3 are shown in FIG. 1 for purposes of description. Each physical counter is associated with circuitry to maintain a count value and to increment the count, when instructed. Each physical counter may also be associated with circuitry to provide the current value of the counter as well as circuitry to clear the counter. Although three physical counter are shown, the techniques described herein are not limited to any number of physical counters. There may be as few as one physical counter or as many physical counters as can be implemented in the die space that has been allocated for maintaining counters. What should be understood is that the number of physical counters is typically less than the number of logical counters.

The integrated circuit may also include a physical counter mapping structure 130. The physical counter mapping structure may maintain an association of each physical counter to logical counter. Because the number of logical counters is typically larger than the number of physical counters, each logical counter may not be concurrently associated with a physical counter. Furthermore, a physical counter may not be currently associated with any logical counter. In other words, the physical counter mapping structure may be used to determine which, if any, physical counter is currently associated with a logical counter.

In one example implementation, the physical counter mapping structure may be implemented as a content addressable memory (CAM) that is associative on the logical counter. As shown in FIG. 1, the physical counter mapping structure is a CAM which contains three elements 131-1-3. Each element is associated with a physical counter. Thus, element 131-1 is associated with physical counter 120-1, element 131-2 is associated with physical counter 131-2, and element 131-3 is associated with physical counter 120-3. Each element may store a logical counter identifier.

As shown, the three elements are currently storing logical counters A, E, and D. However, it should be understood that the element itself is associated with a physical counter, and not any particular logical counter. For example, element 131-1 may be associated with physical counter 120-1, regardless of the particular logical counter stored in that element. Although this example implementation is described with respect to a CAM, the techniques described herein are not so limited. Any type of data structure that is able to map a physical counter to a logical counter may also be used.

The integrated circuit may also include a physical counter module 140. The physical counter module may include circuitry to instruct one of the physical counters to increment. The physical counter module may also include circuitry to retrieve the current value of one of the physical counters. The physical counter module may also include circuitry to cause the physical counter to clear its current count.

The physical counter module may also include associate logic 141. The associate logic may be used to alter the associations of the physical counters to logical counters stored in the physical counter mapping structure. For example, if a physical counter is to be disassociated from one logical counter and re-associated with a different logical counter, the associate logic may ensure that the mappings contained in the physical counter mapping structure are current.

The physical counter module may also include a flush logic module 142. The flush logic module may be used to flush values in the physical counters to an external memory. In some implementations, the flush module may determine the location in memory of a logical counter and retrieve the value stored in a physical counter associated with that logical counter. The location in memory may then be updated with the current value of that logical counter. The flushing operation is described in further detail below.

The integrated circuit may also include operational logic 150. The operation logic is the circuitry on the integrated circuit that provides the functionality of the integrated circuit. For example, in the case on an integrated circuit used in a network switch, the operational logic may provide the functionality needed to switch packets. However, it should be understood that the techniques described herein are independent of any particular functionality provided by the integrated circuit. The operational logic may indicate that certain events are to be counted. Each type of event that is to be counted may be associated with a logical counter. The operational logic may send an indication to the physical counter module that a particular logical counter is to be incremented. The operational logic need not be aware of physical counters, the physical counter mapping structure, or the external memory. The operational logic may simply indicate that a logical counter is to be incremented.

The system 100 may also include a memory 160. The memory may be of any suitable form. For example, the memory may be dynamic random access memory, static random access memory, flash memory, or any other type of memory that is able to store data. Furthermore, the memory may be memory that is accessible by the integrated circuit 110 as well as other components (not shown). What should be understood is that the memory 160 is external to the integrated circuit, and thus occupies no space on the die of the integrated circuit.

For example, a processor (not shown) may have access to the memory and is able to read the data stored therein. The memory may store the current values of the logical counters. If the value of a logical counter is desired, the value may be read from the memory. Because the memory is external to the integrated circuit, there is no need to access the integrated circuit to retrieve the value of the logical counter. Furthermore, although only five logical counters are shown, it should be understood that there is no limit on the number of logical counters, to the extent that sufficient external memory is available. Typically, the number of logical counters may exceed the number of physical counters.

In operation, the operational logic 150 may determine that an event has occurred that requires incrementing a counter associated with the event. The operational logic may send an indication to the physical counter module 140. The indication may include an identifier of the logical counter that is to be incremented. Upon receiving the indication, the physical counter module may access the physical counter mapping structure 130 to determine if the logical counter that is to be incremented is currently associated with a physical counter. For example, in the case of a physical counter structure implemented as a CAM, the logical counter identifier may be CAMed against the physical counter mapping structure. The result of the comparison may be either a CAM hit or miss.

If the logical counter identifier is currently stored in the CAM, there will be a CAM hit. The CAM hit identifies the element of the CAM that is associated with the logical counter identifier. As mentioned above, each element of the CAM is associated with a specific physical counter. Thus, the physical counter may be identified. For example, the operational logic may indicate that logical counter E is to be incremented. As shown in FIG. 1, logical counter identifier E is currently stored in element 131-2 of the physical counter mapping structure. Element 131-2 of the physical counter mapping structure is associated with physical counter 120-2. The physical counter module may then send an instruction to increment physical counter.

If the result of the comparison is a CAM miss, meaning that the logical counter identifier is not currently stored in the physical counter mapping structure, one of two courses of action is taken. The first course of action is taken when there is at least one entry in the physical counter mapping structure that is not currently associated with any logical counter. The second course of action is taken when all of the entries in the physical counter mapping structure are currently associated with other logical counters.

In the first case, an empty entry in the physical counter mapping structure is found by the associate logic 141. This may include examining the physical counter mapping structure to identify an element that is not currently associated with a logical counter, which may be referred to as being empty. The logical counter identifier may then be stored in the empty element by the associate logic, thus associating the logical counter with the physical counter associated with the previously empty element. Just as above, the physical counter module may instruct the physical counter now associated with the logical counter to increment.

In the second case, all elements in the physical counter mapping structure may be currently occupied with logical counter identifiers. Thus, in order to increment the logical counter, the currently existing association of one of the logical counters to a physical counter needs to be removed. In other words, the counter must be flushed to the external memory. The flush logic 142 may be responsible for selecting the entry to flush. Any suitable mechanism may be used to determine which element is to be flushed. For example, in some implementations, the logical counter that was the most recently incremented may be chosen to be flushed. In other implementations, the logical counter that was least recently incremented may be chosen. In yet other implementations, the element to be flushed may be chosen at random. Any other type of cache flushing algorithm may also be used.

In order to flush the physical counter and clear the association between the physical counter and the logical counter, the count currently stored in the physical counter may be stored in the external memory. The physical counter module may use the flush logic 142 to update the current value for the logical counter in the external memory. The flush logic may first retrieve the current value of the logical counter from the external memory 160. For example, if it is determined that element 131-3 is to be flushed, the flush logic may retrieve the value associated with logical counter D from the external memory, because element 131-3 is currently associated with logical counter D in the physical counter mapping structure. In the current example, the logical counter D has a value of 45 stored in the external memory.

The physical counter module 140 may then retrieve the current physical counter value from the physical counter 120-3, because that is the physical counter that is associated with element 131-3. In this case, the current value of the counter is 4. The physical counter module may then add the current value of the physical counter to the retrieved value. The result may then be stored in logical counter D in the external memory. In this example, the resultant value of 49 would be stored in logical counter in the external memory.

The physical counter module may then instruct the physical counter 120-3 to clear its current value in preparation for being associated with a new logical counter. The physical counter module may also empty the entry 131-3 in the physical counter mapping structure, thus disassociating logical counter from physical counter 120-3. At this point, element 131-3 is empty. The physical counter module may then proceed with the steps described above with respect to the first case to associate the now empty entry 131-3 with the logical counter that is to be incremented.

As described above, flushing a physical counter may occur when it is desired to associate a physical counter with a new logical counter. In addition, the physical counter may be periodically flushed to keep the logical counter values stored in the external memory current with the actual counts. For example, logical counter A in the external memory has a value of 10. As shown in the physical counter mapping structure, logical counter A is associated with physical counter 120-1, which currently has a value of 7. Thus, as long as physical counter 120-1 is not flushed, the logical counter A in the external memory will not reflect the most current value of the logical counter. By periodically flushing the physical counters to the external memory, it can be ensured that the logical counters in the external memory contain data that is accurate to within the tolerance of the periodic flush interval. In addition, the physical counters may be preemptively flushed to try and keep free entries available in the physical counter mapping structure.

Although the description above was presented in terms of using a CAM for the physical counter mapping structure, the techniques described herein are not so limited. In another example implementation, the structure may be a an array, with each array element associated with a physical counter and containing a logical counter identifier. The physical counter module may then step through the array searching for the logical counter identifier of interest. What should be understood is that the physical counter mapping structure maintains an alterable mapping of logical counters to physical counters.

Furthermore, although the description of flushing a physical counter to memory included retrieving the current value of the logical counter from the external memory and adding the current value of the physical counter to it, this was for purposes of explanation only. Any other type of operation would also be possible. For example, the logical counter value in the external memory may be simply overwritten with the physical counter value. The two values may be subtracted. Any other arithmetic or logical operations are also possible.

Figure 2:
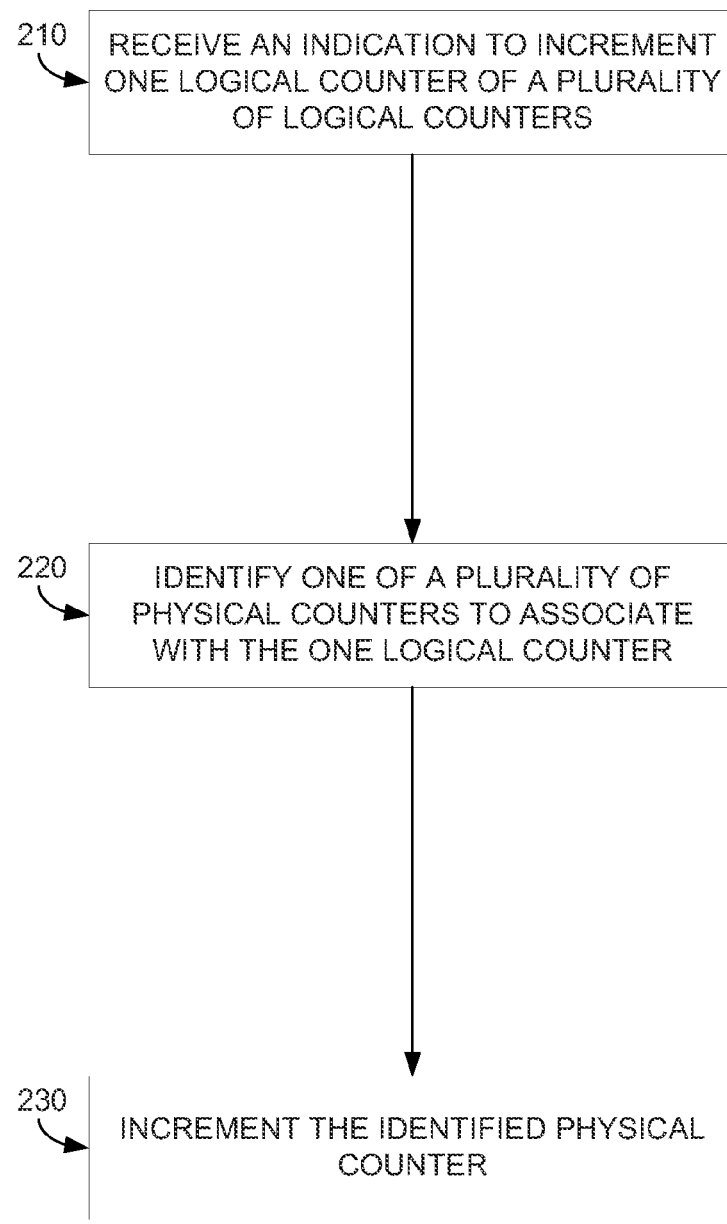
FIG. 2 is an example of a flow diagram for incrementing a physical counter.

FIG. 2 is an example of a flow diagram for incrementing a physical counter. In block 210 an indication to increment one logical counter of a plurality of logical counter is received. For example, the operational logic described above may indicate that a logical counter is to be incremented. In block 220 one of a plurality of physical counters to associate with the one logical counter may be identified. For example, the physical counter may currently be associated with the logical counter, an empty entry for a physical counter may be found, or an entry associated with a different logical counter may be selected for flushing. Regardless of how the physical counter is identified, a physical counter will be associated with the logical counter. In block 230, the identified physical counter may be incremented.

Figure 3:
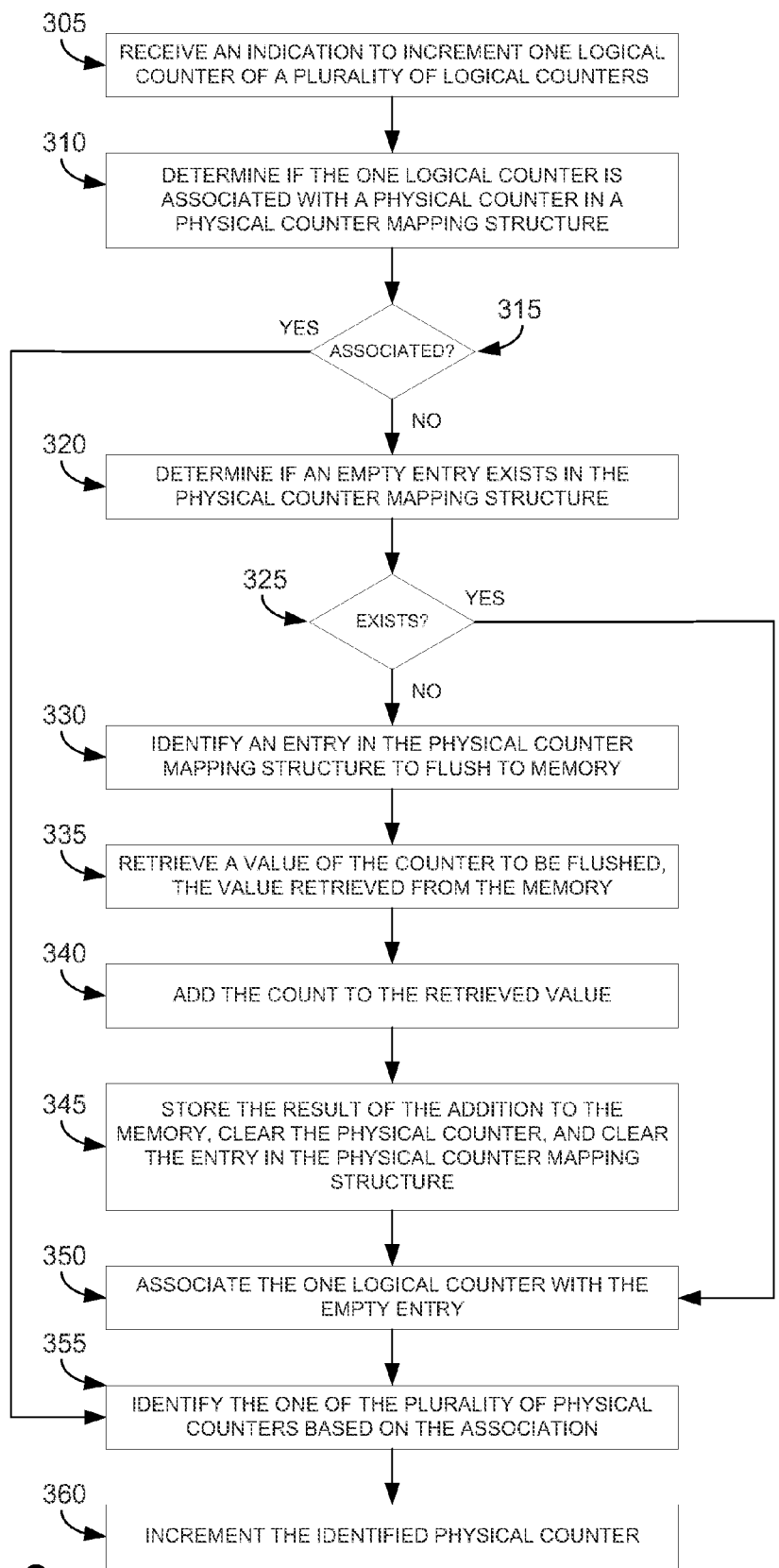
FIG. 3 is an example of a flow diagram for associating a physical counter with a logical counter and incrementing the physical counter.

FIG. 3 is an example of a flow diagram for associating a physical counter with a logical counter and incrementing the physical counter. In block 305 an indication to increment one logical counter of a plurality of logical counters may be received. In block 310 it may be determined if the one logical counter is associated with a physical counter in a physical counter mapping structure. In block 315, the results of the determination in block 310 may be analyzed. If there is a physical counter associated with the logical counter, the process moves to block 355, which is described in further detail below.

If the logical counter is not currently associated with a physical counter, the process moves to block 320. In block 320, it may be determined if an empty entry exists in the physical counter mapping structure. In block 325, the results of the determination in block 320 are analyzed. If there is an empty entry, the process moves to block 350, which is described below. If there is no empty entry, the process moves to block 330.

In block 330, an entry in the physical counter mapping structure to flush to memory is identified. As explained above, any suitable mechanism, such as most recently used, least recently used, or random, may be used to select an entry to flush to memory. In block 335, the value of the counter to be flushed may be retrieved from the memory. In block 340, the count may be added to the retrieved value. In other words, the current value of the physical counter may be added to the value that was retrieved from the memory.

In block 345, the result of the addition may be stored to the memory. In addition, the physical counter may be cleared. Finally, the entry in the physical counter mapping structure may also be cleared. In block 350, the one logical counter may be associated with the empty entry. In other words, a physical counter may be associated with the logical counter. In block 355, the one of the plurality of physical counters may be identified based on the association. The association may have previously existed, was created by finding an empty entry, or was created by flushing a previously existing association. In block 360, the identified physical counter may be incremented.

Figure 4:
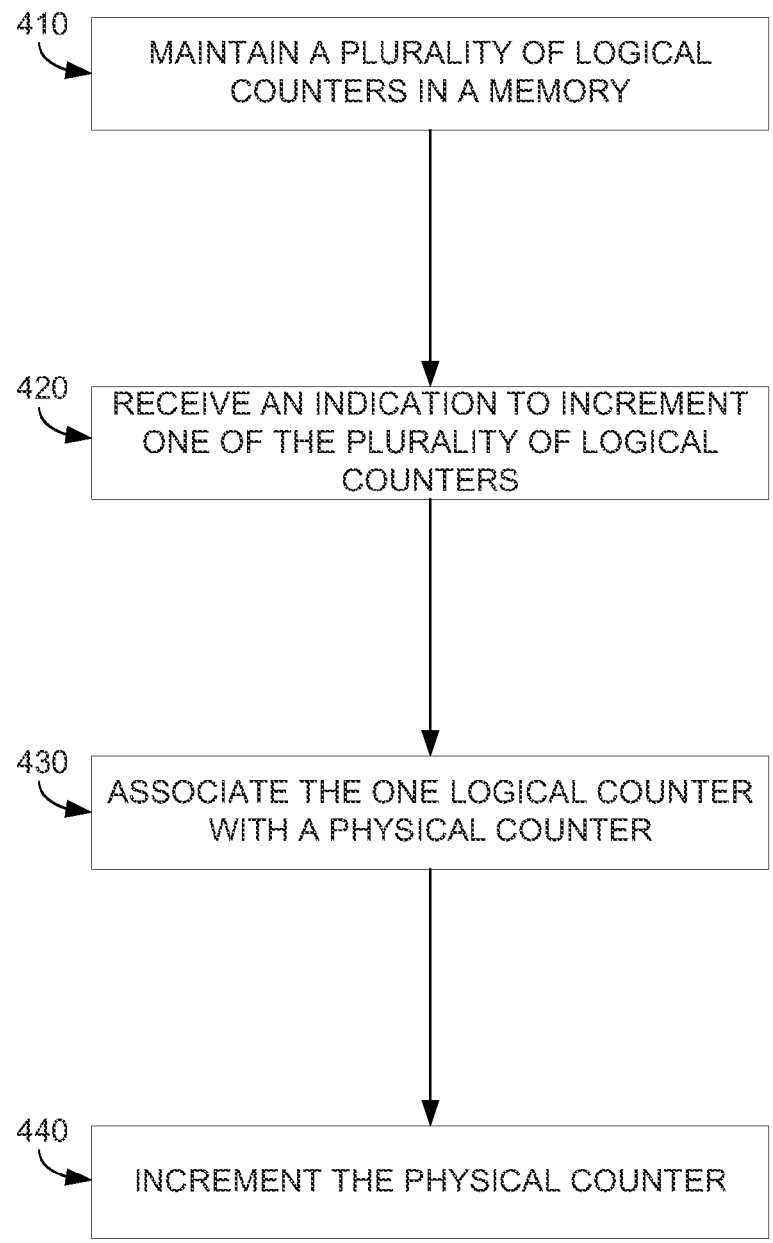
FIG. 4 is an example of a flow diagram for incrementing a logical counter.

FIG. 4 is an example of a flow diagram for incrementing a logical counter. In block 410, a plurality of logical counters may be maintained in a memory. As explained above, every logical counter may be stored in an external memory. In block 420, an indication to increment one of the plurality of logical counters may be received. In block 430, the one logical counter may be associated with a physical counter. As explained above, the association may be previously in existence, may be created by finding an empty entry, or by flushing a current entry. In block 440, the physical counter may be incremented.

Figure 5:
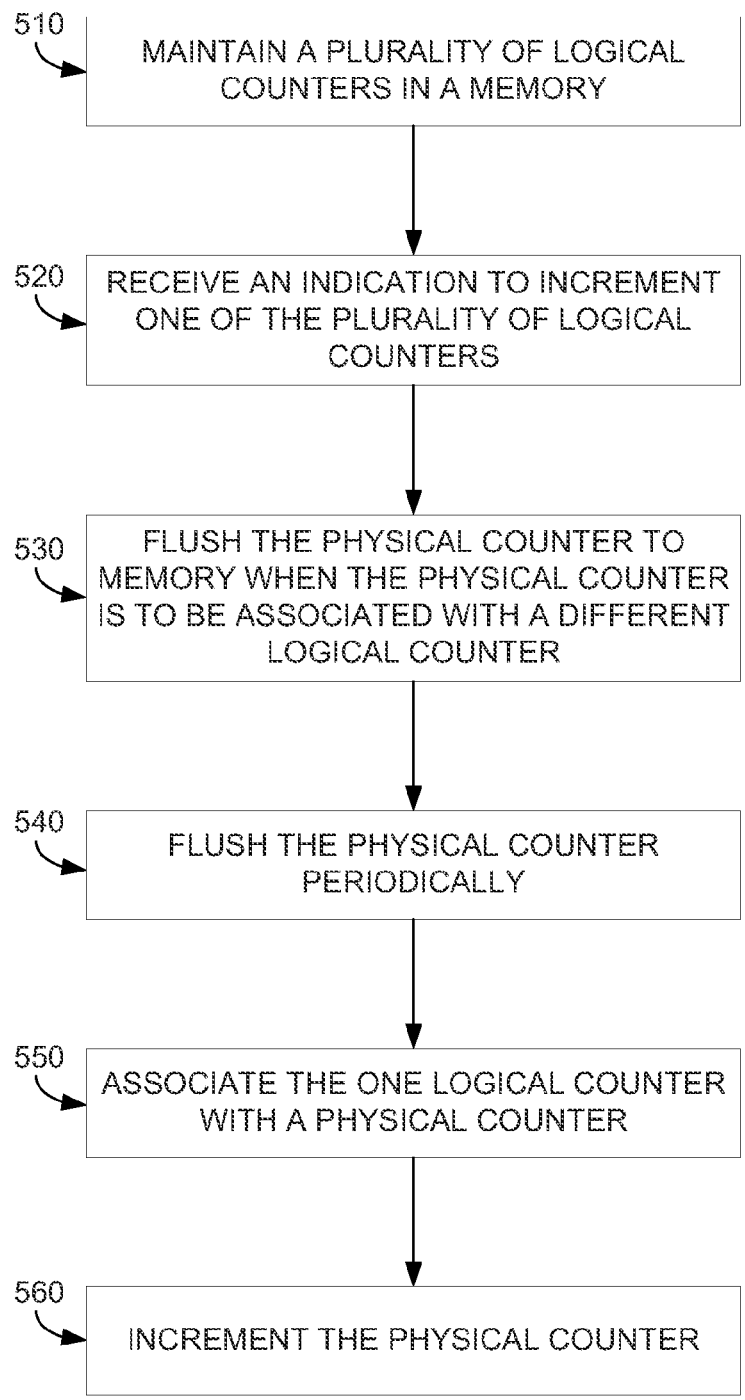
FIG. 5 is an example of a flow diagram for flushing a physical counter to memory.

FIG. 5 is an example of a flow diagram for flushing a physical counter to memory. In block 510, as above, a plurality of logical counters may be maintained in a memory. In block 520 an indication to increment one of the plurality of logical counters may be received. In block 530, when a physical counter is to be associated with a different logical counter, the physical counter may be flushed to memory. As explained above, when no empty entry can be found, one of the currently existing entries may be flushed to memory.

In block 540, the physical counter may be flushed periodically. As described above, in order to prevent the logical counters in the memory from going stale, the physical counters may be periodically flushed. In block 550 the one logical counter may be associated with a physical counter. As above, this may be an existing association, an association created by finding an empty entry, or an association created by flushing an entry. In block 560 the physical counter may be incremented.

I claim:

1. A method comprising:
    maintaining a plurality of logical counters in a memory that is used with an integrated circuit, the integrated circuit having a plurality of physical counters, wherein a number of physical counters is less than a number of logical counters;
    maintaining a physical counter mapping structure that associates each of the physical counters in the plurality of physical counters with a corresponding logical counter;
    receiving an indication to increment a first logical counter of the plurality of logical counters;
    identifying, using the physical counter mapping structure, one of the plurality of physical counters to associate with the first logical counter that is to be incremented;
    incrementing the identified physical counter;
    detecting when a second logical counter is to be associated with the identified physical counter; and then
        incrementing the first logical counter based on a count of the identified physical counter.

2. The method of claim 1 wherein the identifying one of the plurality of physical counters to associate with the first logical counter further comprises:
    determining if the first logical counter is associated with a physical counter of the plurality of physical counters using the physical counter mapping structure; and
    identifying the one of the plurality of physical counters based on the association.

3. The method of claim 2 further comprising:
    determining if the first logical counter is not associated with a physical counter of the plurality of physical counters using the physical counter mapping structure;
    determining if an empty entry exists in the physical counter mapping structure; and
    associating the first logical counter with the empty entry in the physical counter mapping structure.

4. The method of claim 3 further comprising:
    identifying an entry in the physical counter mapping structure to flush to the corresponding logical counter in the memory if no empty entry exists;
    flushing the count in the physical counter of the identified entry to the corresponding logical counter in the memory; and
    associating the first logical counter with the identified entry in the physical counter mapping structure.

5. The method of claim 4 wherein the physical counter mapping structure is a content addressable memory which is addressed by one or more of the plurality of logical counters, wherein each entry in the content addressable memory is associated with one of the plurality of physical counters.

6. The method of claim 4 wherein flushing the count in the physical counter of the identified entry further comprises:
    retrieving a value of the corresponding logical counter to be flushed, the value retrieved from the memory;
    adding the count to the retrieved value;
    storing a result of adding the count to the corresponding logical counter in the memory;
    clearing the physical counter corresponding to the identified entry in the physical counter mapping structure; and
    clearing the identified entry in the physical counter mapping structure.

7. The method of claim 4 wherein identifying the entry to flush further comprises:
    determining a most recently incremented physical counter.

8. The method of claim 4 wherein identifying the entry to flush further comprises:
    determining a least recently incremented physical counter.

9. The method of claim 1, wherein incrementing the first logical counter based on a count of the identified physical counter comprises:
    flushing the identified physical counter to the corresponding logical counter in the memory.

10. The method of claim 9 wherein the identified physical counter is flushed to the memory periodically.

11. A device comprising:
    an integrated circuit;
    a memory connected to the integrated circuit;
    a plurality of physical counters provided on the integrated circuit;
    a plurality of logical counters, each logical counter associated with a location in the memory;
    a physical counter mapping structure to associate each physical counter of the plurality of physical counters to a corresponding logical counter of the plurality of logical counters, wherein a number of physical counters is less than a number of logical counters; and
    a physical counter module that uses the physical counter mapping structure to flush contents of a physical counter to the corresponding logical counter for that physical counter.

12. The device of claim 11 wherein the physical counter module is configured to:
    using the physical counter mapping structure, determine if any physical counter is currently associated with a first logical counter to be incremented;
    in response to the determination that no physical counter is currently associated with the first logical counter, identify one of the plurality of physical counters to associate with the first logical counter;
    create an association between the identified physical counter and the first logical counter by flushing the count of the identified physical counter to the currently associated logical counter in the memory; and increment the identified physical counter.

13. The device of claim 12 wherein the physical counter module identifies the physical counter that is most recently incremented to associate with the first logical counter.

14. The device of claim 12 wherein the physical counter module identifies the physical counter that is least recently incremented to associate with the first logical counter.

15. The device of claim 11 wherein the memory is a content addressable memory that is external to the integrated circuit.

16. An integrated circuit comprising:

a plurality of physical counters;

an alterable physical counter mapping structure to associate each physical counter of the plurality of physical counters to a corresponding logical counter of a plurality of logical counters, the plurality of logical counters being provided in a memory that is associated with the integrated circuit, and wherein a number of physical counters is less than a number of logical counters; and a physical counter module that uses the physical counter mapping structure to flush contents of a physical counter of the plurality of physical counters to the corresponding logical counter of that physical counter.

17. The integrated circuit of claim 16, wherein the physical counter module uses the physical counter mapping structure to flush contents of the physical counter to an external location of the memory.

* * * * *